United States Patent [19]

Ash et al.

[11] Patent Number: 4,669,113

[45] Date of Patent: May 26, 1987

[54] INTEGRATED NETWORK CONTROLLER FOR A DYNAMIC NONHIERARCHICAL ROUTING SWITCHING NETWORK

[75] Inventors: Gerald R. Ash, West Long Branch; Billy B. Oliver, Chatham, both of N.J.

[73] Assignees: AT&T Company, Murray Hill; AT&T Bell Laboratories, Basking Ridge, both of N.J.; AT&T Communications, N.Y.

[21] Appl. No.: 727,880

[22] Filed: Apr. 26, 1985

[51] Int. Cl.[4] ...................... H04M 3/36; H04M 7/06
[52] U.S. Cl. ................................... 379/221; 379/113; 379/230
[58] Field of Search ................... 179/18 EA, 8 A; 340/825.03; 370/62, 60, 58

[56] References Cited

U.S. PATENT DOCUMENTS 4,284,852  8/1981  Szybicki et al. .................... 379/221
4,345,116  8/1982  Ash et al. ............................ 379/221

OTHER PUBLICATIONS

"Sequential Routing Optimization for Circuit Switched Networks", A. Girard et al, *IEEE Trans. on Commun.*, vol. COM-2, No. 12, Dec. 1984, pp. 1234-1242.
G. R. Ash et al., "Servicing and Real-Time Control of Networks with a Dynamic Routing", The Bell System Technical Journal, vol. 60, No. 8 (Oct. 1981), 1821-1846.
G. R. Ash et al., "Design and Optimization of Networks with Dynamic Routing", *Bell System Technical Journal*, vol. 60, No. 8 (Oct. 1981), pp. 1787-1820.
C. A. Dahlbom et al., "History and Description of a New Signaling System", *The Bell System Technical Journal*, vol. 57, No. 2 (Feb. 1978) pp. 225-250.

Primary Examiner—Thomas W. Brown
Attorney, Agent, or Firm—Henry T. Brendzel

[57] ABSTRACT

A nonhierarchial switching system employing a modified unified algorithm for developing link sizes for paths that connect switches in the system and routing sequences for the switches in the system, and further employing means for updating the routing sequences to minimize potential blocking in the network. In one embodiment, the modified unified algorithm develops improved link size determinations by taking advantage of traffic sensitive dynamic routing on the alternate paths available in the nonhierarchial switching system for connecting any switch to any other switch in the system. Updating of the routing sequences is achieved in that embodiment by evaluating the least loaded path for each potential connection of two switches in the system and, when appropriate, by installing the least loaded path as the second choice path in the routing sequence for that potential connection.

16 Claims, 10 Drawing Figures

INTEGRATED NETWORK CONTROLLER FOR A DYNAMIC NONHIERARCHICAL ROUTING SWITCHING NETWORK

BACKGROUND OF THE INVENTION

1. Field of the Invention

This invention relates to switching systems employing nonhierarchical routing and, more particularly, to systems where the routing is a function of traffic load conditions.

2. Description of the Prior Art

The U.S. telecommunications toll network includes a large number of switching offices and trunk lines interconnecting those offices. Since these elements of the network are expensive, designers of the tool network have always striven to employ as few offices and trunks as possible. Thus, it has long been established that a network may be designed with fewer trunks than is required to guarantee a path from any office to any other office regardless of network load. The rationale for this is that customers are willing to tolerate call blocking as long as it occurs infrequently. A telecommunication network that permits call blocking is able to more efficiently utilize its resources.

To minimize blocking with a given amount of resources, the network must be given structure and efficient path selection algorithms. Until recently, the U.S. telecommunications network has been structured in a hierarchical fashion. Offices were ranked by class (1 through 5) and a routing plan was employed that directed the switching from one office to another based on the respective ranking of the offices. This hierarchical structure served well for many years.

In an effort to minimize blocking in the hierarchical structure, various arrangements and algorithms exist for determining appropriate routes. One such arrangement is described by Szybicki et al. in U.S. Pat. No. 4,284,852, issued Aug. 18, 1981. In accordance with the Szybicki et al. arrangement, a plurality of switching end offices (class 5 offices) are grouped into a cluster, with each switch in the cluster having direct trunk lines to all other switching offices in the cluster. In addition, all of the switching offices have trunks to a tandem office, data links to a logic device, and memory for storing routing information. A call can originate or terminate at any office and, therefore, each office stores within its memory the first path choice to all other offices; that choice being the direct trunk connecting the offices. In addition to each first path choice, the logic device provides to each switching office information regarding alternate routes within the cluster of switching offices. The alternate route information, which is also stored in memory within the switching offices and used when the office is the originating office, is derived by the logic device from information supplied by the data links. When no available path is found within the cluster, the originating switch attempts to establish a path through the tandem office, and when that fails, the call is blocked.

To more effectively minimize network costs and also minimize blocking a new structure is currently being implemented in the AT&T Communications network which includes a new routing technique called Dynamic Nonhierarchical Routing. The new structure no longer ranks the toll offices, and paths between switching offices are established based on routing sequences stored in each of the (originating) toll offices. One description of a dynamic nonhierarchical arrangement for routing traffic is described in my U.S. Pat. No. 4,345,116 issued Aug. 17, 1982. Additional descriptive material is found in, "Design and Optimization of Networks With Dynamic Routing," by Ash et al., and "Servicing and Real-Time Control of Networks With Dynamic Routing," by Ash et al., both in The Bell System Technical Journal, Vol. 60, No. 8, October 1981, pp. 1787-1846. FIG. 1 is descriptive of my previously disclosed arrangement.

In FIG. 1, the telecommunication network, represented by block 410, includes switching offices 310 through 315 and interconnecting trunk groups (links) 316 through 326. There is no hierarchical designation to switches 310 through 315 although they are drawn to imply that in the old hierarchical routing arrangement switching offices 310 and 315 were the Primary Centers, switching offices 311 and 314 were the Sectional Centers and switching offices 312 and 313 were the Regional Centers.

Switches 310-315 are stored program control switches, which means that they have memory and that at least some of their switching functions are controlled by the memory contents. Specifically in connection with my prior art nonhierarchical arrangement, each of the switches contains memory for storing information regarding the trunk links between itself and other switches, and information regarding the routing sequences available for establishing a path. Path choices are made by the switching offices in accordance with the stored information.

To effect a connection between switching office 311 and switching office 314, a direct path may be established via link 321. A path may also be established via switching office 312 (links 319 and 317), via office 310 (links 324 and 323), via office 313 (links 318 and 320) or via office 315 (links 322 and 325). Still additional paths may be established by using more than one office (e.g., link 319, office 312, link 316, office 313 and link 320). In accordance with the described nonhierarchical dynamic routing arrangement, switching office 311 contains in its memory a "map", or table, of the link sizes (number of trunks in the trunk group) between itself and its neighboring offices and a table of routing sequences for use at different time periods during the day containing the sequence for establishing connections with switching office 314 (as well as sequences for establishing connections with other offices). The routing sequence identifies the first route choice and subsequent route choices, e.g., first choice being path 321 and subsequent choices being path 319-312-317, then path 318-313-320, then path 322-315-325. The first choice path is selected unless all of the trunks in that path are busy. When that condition is encountered, path 319-312-317 is selected unless all of its trunks are also busy. Only when all paths in the routing sequence are found busy is the call blocked.

In the selection of multi-link paths (such as the path containing link 319, switching office 312, and link 317) it is possible for one of the links to be unavailable. When the first link is available but the second link is not, a "crankback" signal is sent back to the originating office so that a subsequent path in the sequence can be attempted.

From the above it should be appreciated that the link sizes and the route selection sequences are interrelated and that both are extremely important to the effective utilization of network resources. Hence, the system of FIG. 1 attempts to concurrently optimize both the design of the network and the design of the route selection sequence for use at different time periods during the day. It attempts to minimize the number of trunks in each link that is required in order to achieve a desired level of service and, concurrently, it determines the desired route selection sequences for the determined link sizes. These determinations are made in the processes described below.

While network 410 in FIG. 1 carries traffic, in accordance with my previously disclosed arrangement it also sends information concerning the carried traffic (e.g., call attempts and usage) to three processes which are identified in FIG. 1 by network designer block 430, demand servicer 450, and dynamic router 470. Each of the three is preceded by a traffic estimator (blocks 420, 440, and 460, respectively).

In the network designer arrangement of blocks 420 and 430, traffic is gathered over long intervals. The gathered traffic is used to determine the appropriate link sizes for the network to achieve a predetermined grade of service and the optimum route selection sequences for use at different time periods for the forecasted traffic load (which is based on projection factors and statistics derived from the previous gathering interval). A twice yearly cycle time for the gathering of information is quite appropriate for the network designer arrangement. The information developed by network designer 430 is used to efficiently allocate the physical resources that are already in the field as well as the planned construction.

In the demand servicer arrangement of blocks 440 and 450, traffic information is gathered with a shorter cycle time, perhaps weekly, and it is used to fine tune the link sizes to reflect changes in actual traffic demands which deviate from forecasted demands and cause unexpected service problems. Processes 430 and 450 also modify and update the routing sequences for use at different time periods during the day that each switch maintains.

In the dynamic router arrangement of blocks 460 and 470, even more frequent adjustments to the routing sequences are developed. The traffic information is gathered with a still shorter cycle time, perhaps hourly, and adjusted time sensitive routing sequences are developed that are a function of the currently anticipated traffic. Thus, the dynamic router arrangement of blocks 460 and 470 deals with load deviations from the loads estimated in blocks 420 and 440 that are actually experienced. This includes day-to-day load variations, unforecasted permanent increases in demand (until capacity is augmented per determinations made by the demand servicer arrangement), and network congestion under overload and failure conditions.

With the aforedescribed combination of elements we obtained an improved nonhierarchical arrangement for establishing alternate routing sequences responsive to variations in the traffic demand placed upon the links in the network. The improved arrangement permits the system to take advantage of noncoincident peak traffic loads on different routes.

As indicated above, my disclosed system receives traffic information (which are measurements of traffic load over a given time period) from the network. That information is very helpful in determining the needed total number of trunks that ought to be allocated for traffic to each office and is also helpful in determining the appropriate routing sequences. However, traffic information by itself does not reveal existing congestion on various paths when alternate paths handle the traffic and, consequently, routing sequences based on traffic measurements alone do not necessarily result in the selection of the most efficient routing sequences. Also, the present network designer process does not account for the fact that access to node-to-node traffic capacity (i.e., between any originating office and terminating office) is substantially more efficient with real-time traffic sensitive routing, which is responsive to both network status information and traffic information, in the nonhierarchical structure than with time sensitive routing, which is responsive only to traffic information. The result is a "required link size" determination in the prior art that is greater than necessary for real-time traffic sensitive routing.

It is an object of this invention to optimize the allocation of resources in the telecommunications network.

It is a further object of this invention to obtain additional information for each switching office in the network and to thereby improve the process of determining the appropriate link sizes and route selections in the network.

It is still another object of this invention to provide means for near real-time evaluation of the network load and to make the network route selections responsive to the network load in corresponding near real-time.

SUMMARY OF THE INVENTION

These and other objects are achieved with my integrated network controller for the nonhierarchical switching arrangement by having each switch in the telecommunications switching network send idle trunk information to a central integrated network controller on a periodic (e.g., 5-second) basis when trunk status changes occur (i.e., idle trunks are created or removed). This information augments the traffic information that, as before, is regularly sent to the network control logic. Based on the received traffic information, the integrated network controller determines the required number of trunks for each link in the network with a process that adjusts for the traffic handling capacity between nodes based on the availability of alternate routes. In conjunction with the derived link sizes, the integrated network controller also develops route selection sequences for each switch in the network, with each sequence comprising a "first choice" path and "subsequent choice" paths. Those sequences that differ from the route selection sequences already stored in the switching offices are communicated to the switching offices to update the network's route selections. Different first choice paths are created for different periods of the day, and those too are communicated to the switching offices.

Based on the received idle trunk information (as well as the traffic information) the integrated network controller provides additional, near real-time, updates of the routing sequences. Since the idle trunk status changes are communicated as soon as they occur, this updating is done in near real-time. The near real-time updates affect only the "subsequent choice" paths of the routing sequences. The updates are determined in accordance with a "least loaded path" approach that strives to equalize the load in the entire network.

DETAILED DESCRIPTION

Overview

Figure 2:
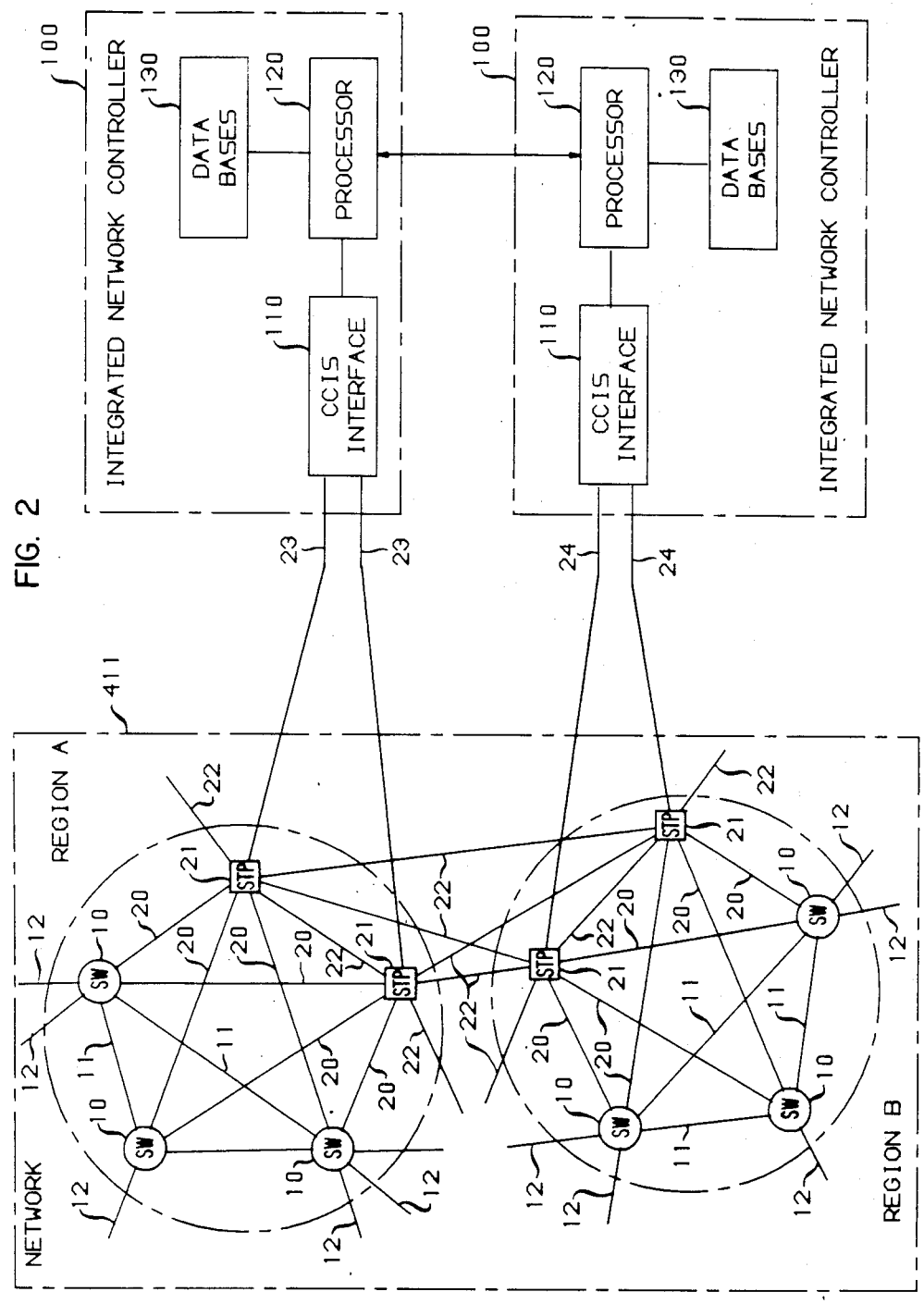
FIG. 2 describes a nonhierarchical switching system employing an integrated network controller.

FIG. 2 illustrates one realization of a telecommunications system embodying the principles of my invention. Elements 10 in FIG. 2 are toll switching offices ("switches" or "nodes", for short) of network 411 in geographical regions A and B. A plurality of regions make up the telecommunications network. The switch arrangement of network 411 is nonhierarchical and each of the switches is under stored program control. Specifically, each of the switches contains a map, or table, in its memory identifying the available trunks between itself and other switches and a table of route sequences. A route sequence specifies the different paths that may be tried in order to establish a path between the switch that maintains the sequence (the originating node) and a specified other switch (the terminating node). A route sequence contains a first choice path, a second choice path, a third choice path, etc. Bundling together all path choices other than the first, each routing sequence is viewed to consist of a "first choice" path and "subsequent choice" paths.

Links 11 in FIG. 2 interconnect switches 10 within each region and links 12 connect switches 10 to other regions. Elements 10, 11 and 12 represent the message network through which calls are carried from one subscriber to another. The message network may carry circuit-switched traffic, packet-switched traffic, and channel-switched traffic without departing from the principles of my invention. In a circuit switched network, a path is established from one office to another over voiceband trunks (VTs) on the circuit-switched bandwidth. The path is established at the beginning of a call and it remains intact until the end of the call. In packet switching approaches, a path (or a virtual path) is established on virtual circuits or narrowband trunks (NTs) over the packet-switched bandwidth. For the channel-switched traffic, wideband trunks (WTs) are used to establish connections over the channel-switched bandwidth. Connections on paths comprising VTs, NTs or WTs are functionally very similar and, hence, the principles of my invention apply.

In addition to the message network, FIG. 2 depicts a signaling network which comprises lines 20 connecting each switch in a region to two signal transfer points 21 within the region. Lines 22 interconnect the signal transfer points. The U.S. telecommunications toll network currently employs such a signaling network, called the Common Channel Interoffice Signaling (CCIS) network. Hence, the CCIS network may conveniently be used in connection with my invention. The CCIS arrangement (which employs packet switching) is described in, among other places, *The Bell System Technical Journal*, Vol. 57, No. 2, February 1978. Of particular interest in that issue is the article, "History and Description of a New Signaling System", C. A. Dahlbom and J. S. Ryan, (pp. 225-250), which describes some of the history and basic structure of the CCIS network.

Lines 23 in FIG. 2 connect signal transfer points (STPs) of region A to a first integrated network controller (INC) 100 while lines 24 connect signal transfer points 21 in region B to a second INC 100. Each INC 100 comprises a CCIS interface 110, a processor 120 connected to interface 110 and a data base block 130 connected to processor 120. In addition to the message and the signaling networks, FIG. 2 depicts two INC 100. One INC 100 is connected to the signaling network via two lines 23 extending to STPs in region A, while the other INC 100 is connected to the signaling network via two lines 24 extending to STPs in region B. Two lines 23 and two lines 24 are employed for redundancy and, additionally, information flowing via lines 24 (from region B or from any other region) can flow via lines 23 (through the STPs in region A). With this arrangement, although each INC 100 normally performs its designated tasks on only a portion of the entire network, should one fail, the remaining INC 100 can handle the entire network. For this contingency condition, each subsystem maintains information about the entire network and processors 120 are interconnected to keep each processor informed of the status of the other processor.

As a general characterization of the FIG. 2 system, the INC 100 concerns itself with the determination of the most cost effective network configuration (the proper number of trunks in each link), selection of minimum cost paths between originating and terminating switching offices, and design of both time varying and real-time traffic sensitive routing patterns to achieve minimum cost trunking. The switching offices in network 411 select the actual links in concert with the route determinations of INC 100.

The dynamic, or time varying, nature of the routing scheme is achieved by INC 100 through the changes in route choices on a regular basis and as needed. Although the intercity traffic demands change with time, some of the more pronounced traffic changes are reasonably predictable within each day. To take advantage of this predictability, a day is divided in the system of FIG. 2 into a number of contiguous routing intervals called load-set periods (LSPs). Routing sequences are developed for each load-set period and the first choice paths are transmitted at the appropriate time to each switching office in the network. The real-time traffic sensitive nature of the routing scheme is achieved by computing updates to "subsequent choice" paths; these updates are derived every few seconds from traffic and idle trunk information that each switch sends to INC 100. The updates modify, as necessary, the "subsequent choice" paths in the sequences stored in the switching offices.

The processing done within INC 100 is performed in processors 120 in conjunction with data base blocks 130.

EAch block 130 maintains a number of distinct tables of information to assist its associated processor 120. These tables are as follows:

1. Trunks in Service table

This data base contains the number of trunks in service for all the links in network 411. The information is stored in terms of originating switch—terminating switch pairs (OS-TS pairs).

2. Traffic Information data base

This data base contains a measure of the traffic in network 411 and, specifically, the number of attempts, the number of blocked calls, and the usage counts associated with each OS-TS pair. It also maintains a time interval identifier which is used to develop the five minute traffic data. Peg counts (attempts), overflow counts (blocked calls), and usage counts arriving from network 411 during each time interval are accumulated to develop five minute traffic measures.

3. Trunk Status Map data base

This data base contains the status of trunks in the links of network 411. The information, which is arranged by OS-TS pairs, indicates the number of idle trunks in each trunk group. Because idle trunk information is communicated to INC 100 every five seconds as changes in status occur, this map reflects the status of the entire network in near real-time.

4. Routing data base

This data base contains an image of the current routing sequences in switching offices 10 for which the associated processor (120) has primary responsibility and, separately, for which it has backup responsibility. Each OS-TS pair has a unique routing sequence and each routing sequence has a "first choice" path and "subsequent choice" paths.

5. Routing Candidate list

This data base contains two lists of the path candidates (considered during the route sequence design process) for each OS-TS pairs in network 411. One list contains candidates for the OS-TS pair for which the associated processor has primary responsibility, and the second list contains candidates for the OS-TS pairs for which the processor serves as a backup. In addition to being associated with a particular OS-TS pair, each path candidate may be designated as a primary candidate, a secondary routing candidate, a final routing candidate, etc. This data base also identifies the "first choice" paths to be used for each LSP.

Figure 3:
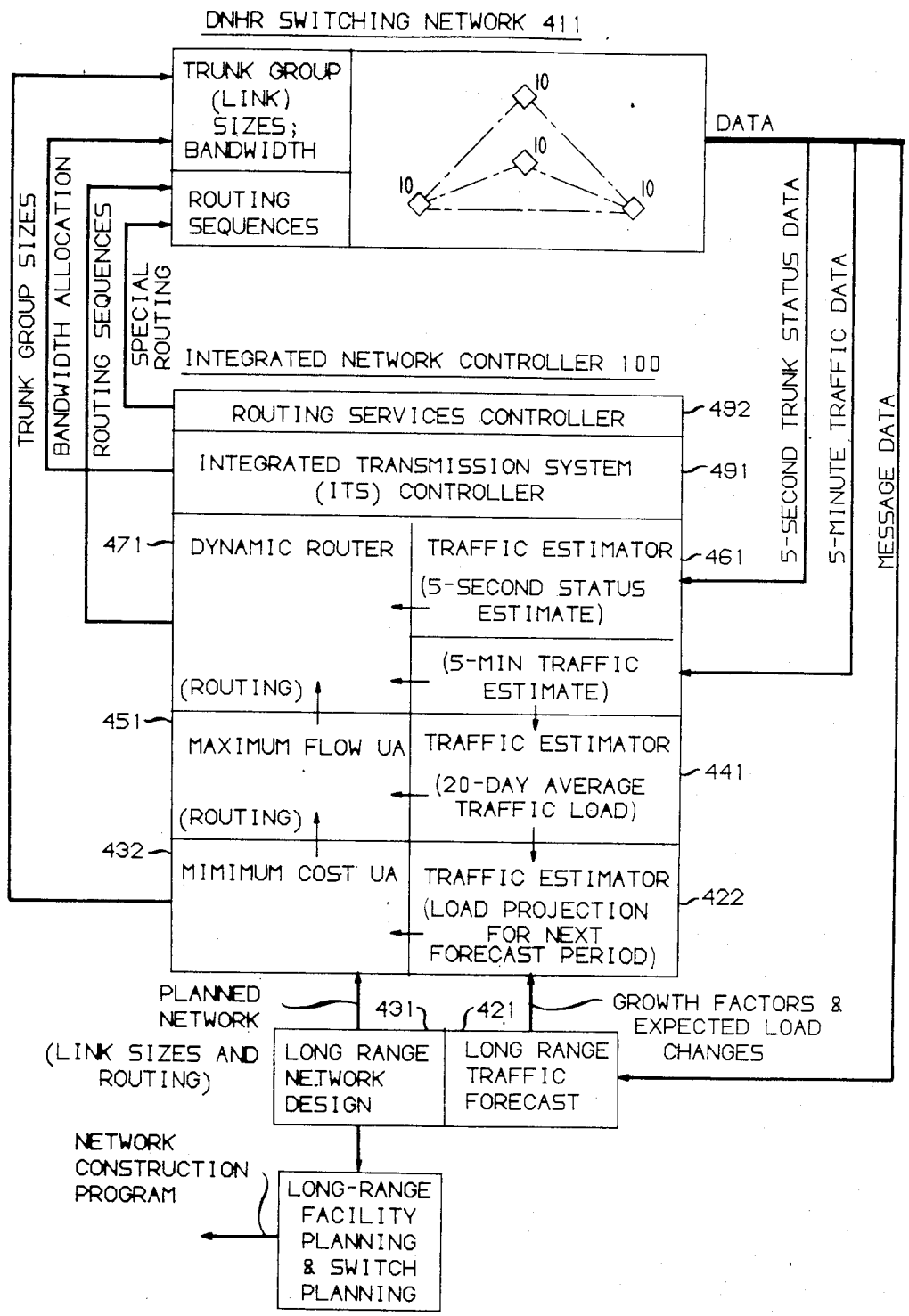
FIG. 3 depicts the structure of an arrangement that develops link sizes and route selection sequences in accordance with the principles of this invention.

Functionally, the operation of INC 100 can most effectively be described with reference to FIG. 3 (which has some similarities in FIG. 1). In FIG. 3, message network 411 provides three types of output to INC 100: (1) traffic information in the form of sampled billing information (message data), (2) traffic information in the form of switch-to switch attempt counts, blocked call counts and trunk usage counts, and (3) idle trunk information. The sampled billing information is applied to network forecasting arrangement 421 while the remaining traffic information and idle trunk information are applied to traffic estimator 461. As in the prior art system of FIG. 1, the information developed in long range network forecaster arrangement 421 and 431 is based on long term observations of the billing information. This long range network forecaster, which makes a multiple year traffic forecast in element 421 and a long range network design in element 431, derives long range plans for network capacity. These plans in turn derive the network construction program. Traffic forecaster 421 also provides growth factors and expected load changes to INC 100, and network designer 431 provides the planned network information including planned trunks and planned routing to INC 100. Within INC 100, traffic estimator 461 develops estimates every five seconds of the current number of idle trunks in each trunk group and develops estimates every five minutes of the current network traffic load and blocking. These estimates are used in the route update process within dynamic router 471 to determine routing sequences for each of the switching offices in network 411. Traffic estimator 441 develops estimates every week of the 20-day average network traffic load and blocking. These estimates are used by the maximum flow unified algorithm 451 to generate new first path choices and subsequent path choices in the routing candidate list for the route update process within dynamic router 471. Traffic estimator 422 develops three-month estimates of the traffic load based on (a) the 20-day average load from traffic estimator 441, and (b) growth factors as well as expected load changes from traffic forecaster 421. These predicted traffic loads plus the currently planned trunks and routing from network designer 431, all for the next three months, are used by minimum cost unified algorithm 432 to determine any adjustments to the planned trunks and routing required to meet the loads projected for the next three months. These trunks are then installed in the network, and the routing is provided to the maximum flow UA 451, which later determines adjustments to the routing based on the actual 20-day average traffic load measured in the next forecast period. Integrated transmission system (ITS) controller 491 controls bandwidth allocation and trunk group sizes on ITSs. ITSs provide transmission capabilities optimized for circuit-switched voiceband (CSVB) traffic, packet-switched narrowband (PSNB) traffic, and channel-switched wideband (CSWB) traffic. ITS controller 491 controls the allocation of the ITS bandwidth to CSVB, PSNB, and CSWB traffic such that, for example, an overloaded segment of bandwidth for CSVB traffic would be allocated more bandwidth from the CSWB or PSNB segments if these segments were relatively idle. ITS controller 491 also controls the maximum number of NTs and VTs for PSNB trunk groups and CSVB trunk groups, respectively. Routing services controller 492 allows customer specification of routing paths having preferred characteristics, such as light guide facilities or premium quality voice facilities.

The process employed within arrangements 431, 432, and 451 for determining required link sizes and route sequences is based on a modified unified algorithm (modified UA). The modified unified algorithm is similar to the unified algorithm employed in connection with the FIG. 1 system and described in the aforementioned articles in Vol. 60 of *The Bell System Technical Journal* and in the earlier U.S. Pat. No. 4,345,116. The modification, described hereinafter, relates to the adjustment in the traffic handling capacity of network 411.

Dynamic router 471 is cognizant of the routing sequences developed by arrangements 431, 432 and 451 and of the information relating to both traffic and idle trunk status in network 411. Based on the available information, element 471 develops updated routing sequences for network 411 in accordance with a least loaded path approach and communicates preplanned changes in the first choice path and any required changes in the "subsequent choice" paths to the switching offices.

Figure 4:
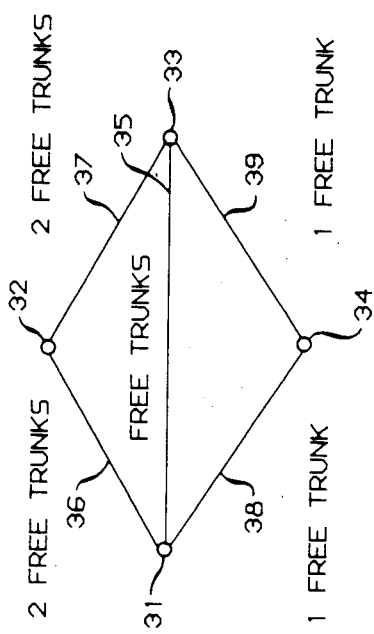
FIG. 4 illustrates the principle of least loaded routing.

FIG. 4 provides a simple example of the least loaded path approach employed in element 471. In FIG. 4, switching office 31 seeks connection to switching office 33. There is a direct link (35) between office 31 and office 33; one alternate route comprising link 36, switching office 32 and link 37; and one alternate route comprising link 38, switching office 34 and line 39. Link 35 has 0 free trucks, links 36 and 37 have two free trunks each and links 38 and 39 have one free trunk each. If the routing sequence were fixed at (31-33), followed by (31-34-33) and then followed by (31-32-33), thus the sought connection from office 31 to office 32 would be established via office 34 because the first choice route (link 35 on route 31-33) has no idle trunks. Alas, the established path would seize the last free trunk on link 38 and the last free trunk on link 39. This would cause all calls between office 34 and its neighboring offices to be blocked. On the other hand, a least loaded path strategy would—based on the available trunk information—modify the alternate routing sequence to (31-3-2-33) followed by (31-34-33), and the sought connection from office 31 to office 32 would be established via office 32. A subsequent call would not be blocked because of the established connection.

Unified Algorithm

Figure 1:
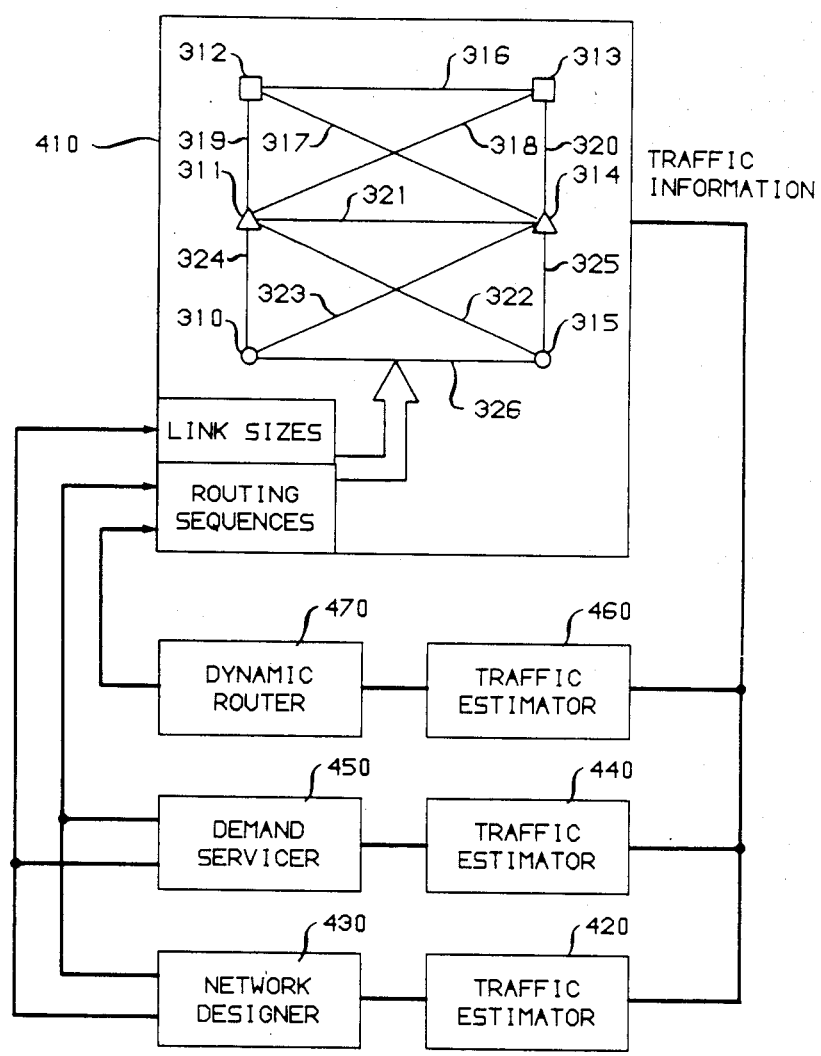
FIG. 1 depicts the prior art structure of an arrangement for developing link sizes and route selection sequences in a nonhierarchical switching system.

The unified algorithm (UA) used in the prior art system of FIG. 1 to design near minimum cost non-hierarchical networks combines into one systematic procedure various network design concepts, such as time sensitive routing, routing traffic along least costly paths, engineering more efficient trunk groups, minimizing incremental network cost, etc.

One important aspect of the algorithm is a traffic estimation process for determining future network needs. These estimations are hindered, however, by network traffic load variations which consist of random variations within each hour, deterministic hour-to-hour variations, random day-to-day variations, and month-to-month (seasonal) variations. In the prior art system of FIG. 1, the load estimations are evaluated in blocks 420, 440 and 460 based on the observed traffic in network 410. Specifically, the estimations are based on the offered traffic between node pairs. The different time constant variations in traffic load are differently accounted for in the UA, but of particular relevance to the instant invention is the accounting for day-to-day variations.

The prior art approach to day-to-day offered load variations uses an equivalent load technique that models each OS-TS pair in the network as an equivalent, nonoverflowing trunk group and applies the equivalent load estimate to each OS-TS pair without reference to other pairs. More specifically, the equivalent load process determines the number of trunks, N, that are required in the equivalent nonoverflowing trunk group to meet the required trunk group blocking probability, b, for the forecasted load, A, with its specified peakedness, Z, and specified level of day-to-day variation, V. The required number of trunks to satisfy the forecasted load on a link is then calculated.

Holding fixed the specified peakedness Z and the calculated N, an equivalent load R is evaluated that corresponds to the traffic load that can be carried by the N trunks if the forecasted load has no day-to-day variation.

Armed with the equivalent load estimates, the unified algorithm simultaneously determines the routing and required trunking between all OS-TS pairs in the network, with the objective being minimization of network (410) cost while providing an objective OS-TS blocking level.

Figure 5:
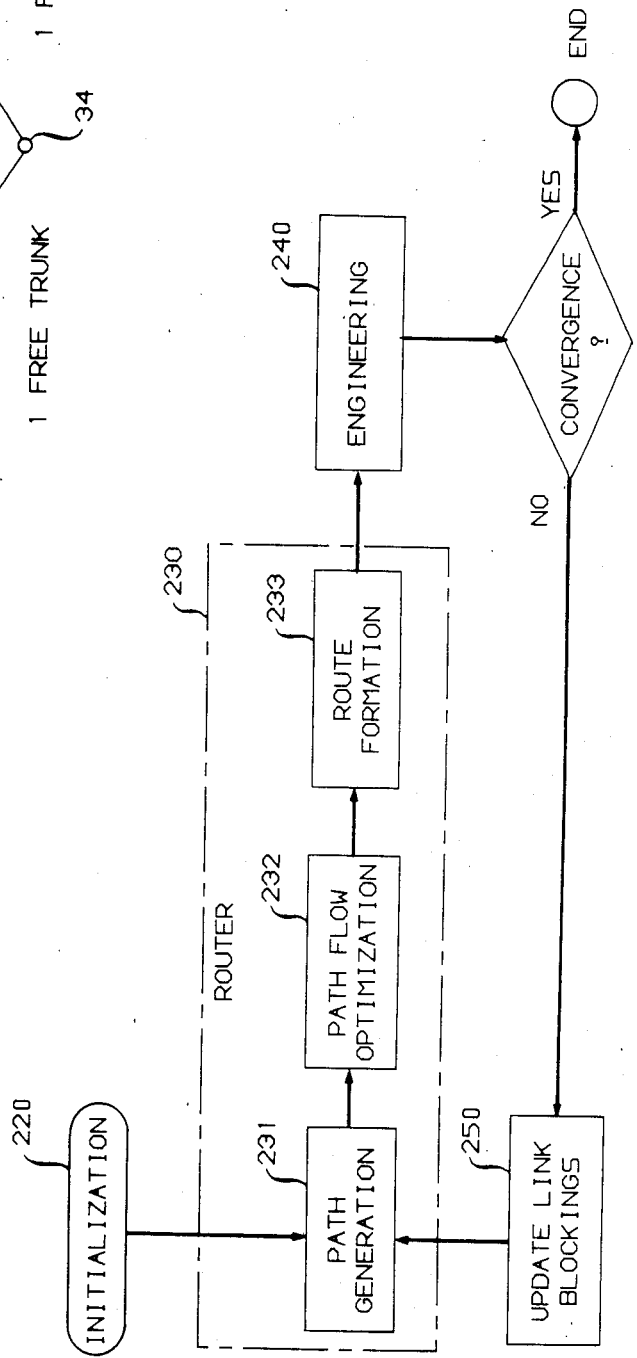
FIG. 5 shows the iterative structure of the network design algorithm, or unified algorithm.

Briefly describing the unified algorithm, FIG. 5 shows it to be an iterative process comprising an initialization module 220, a router 230, an engineering module 240, and an update-link-blocking module 250. Input parameters to the UA include link cost, the equivalent node-to-node offered load, and the desired maximum node-to-node blocking level. Initialization module 220 develops an estimate of the optimum link blocking for each link in network 411. Within router 230 and engineering module 240, the current estimates of the optimum link blocking are held fixed. Router 230 determines the optimal routes for each design hous, and the optimum routing is provided to engineering module 240 to determine the number of trunks required on each link to meet the optimum link blocking. Once the links have been sized by engineering module 240, the cost of the network is evaluated and compared to the last iteration. If the network cost is still decreasing, module 250 computes a new estimate of the optimum link blocking. The new optimum link blocking objectives are fed to router 230 which again selects optimum routing, and the process repeats.

As shown in FIG. 5, router 230 consists of three steps: path generation 231, path flow optimization 232, and route formation 233. Step 231 finds the shortest (least cost) paths between the nodes in network 410, while step 232 assigns carried traffic to the candidate paths to minimize network costs. Route formation module 233 determines the path sequences that best match the optimal path flows evaluated in module 232 and thus, the output from router 230 is the optimal route sequence to be used for each hour for each node-to-node pair.

Holding the blocking fixed enables the path flow optimization step assignment problem to reduce to a set of linear inequalities, where the object is to minimize $$\sum_{i=1}^{L} M_i \Delta a_i$$

subject to $$\sum_{k=1}^{K} \sum_{j=1}^{J_k^h} P_{jk}^{ih} r_{jk}^h \leq a_i + \Delta a_i$$

$$\sum_{j=1}^{J_k^h} r_{jk}^h = R_k^h \left[ 1 - \max \left[ \prod_{j=1}^{J_k^h} B_{jk}^h, GOS \right] \right],$$

$$r_{jk}^h \leq UPBD_{jk}^h,$$
$$r_{jk}^h \geq 0, a_i \geq 0$$

where
 $i = 1, 2, \ldots, L,$
 $h = 1, 2, \ldots, H,$
 $j = 1, 2 \ldots, J_k^h,$ and
 $k = 1, 2, \ldots, K$ In the above equations, the variables are:
 $M_i$ = incremental link dollar cost per carried erlang on link i,
 $a_i$ = existing link capacity (equal to the maximum carried load on link i over all hours), $\Delta a_i$ = augmentations above the existing link capacities $a_i$, L = number of links, $P_{jk}^{ih}$ = 1 if path j for OS-TS pair k uses link i in hour h; 0 otherwise, $r_{jk}^h$ = carried load path j for OS-TS pair k in hour h, $J_k^h$ = number of paths for OS-TS pair k in hour h, K = number of OS-TS pairs, H = number of design hours, $B_{jk}^h$ = blocking probability on path j for OS-TS pair k in hour h, $UPBD_{jk}^h$ = upper bound on flow on path j of OS-TS pair k in hour h, GOS = desired maximum node-to-node blocking grade of service, and lastly, $R_k^h$ = equivalent offered load to OS-TS pair k in hour h.

The above summarizes the minimum cost formulation of the UA, as depicted in element 432 of FIG. 3. For the maximum flow formulation of the UA, as depicted in element 451 of FIG. 3, the objective function is changed as follows: minimize $$\sum_{i=1}^{L} \Delta a_i$$

where the incremental link costs $M_i$ are set to 1 in order to transform the objective function from incremental cost to incremental network capacity. The capacity augmentations $\Delta a_i$ produced by this optimization cannot actually be added to the network. Hence, the traffic that would have been carried on these augmentations will actually be blocked. But since we have minimized these hypothetical capacity augmentations, this routing solution approximates the minimization of total blocked traffic, or the maximization of flow.

Solution of the multi-variable linear set described above is derived by application of any one of known approaches. One such approach is described in the aforementioned *Bell System Technical Journal* article (Vol. 60, No. 8) as the Heuristic Optimization Method (HOM). Another approach, known as the Simplex Method, is embodied in a commercial (IBM) program known by MPSX/370. Still another approach utilizes the algorithm recently formulated by N. Karmarkar.

Modified Unified Algorithm

In determining the equivalent load, the current model does not consider the fact that on any particular day and at any particular time some OS-TS pair loads will be above their average and some below. Because of this averaging, and because the alternate routes associated with each OS-TS pair can carry overflow traffic, a substantial improvement in network design can be realized. Simulation studies have shown that the greatest improvement in network design can be had by improving the accounting for the day-to-day variations.

In accordance with the principles of my invention, the equivalent load determined in load estimators 421, 422, and 461 and used in the modified UA is modeled to account for the way the FIG. 2 system effectively gives each OS-TS pair access to the capacity of a large number of parallel paths and, through use of traffic sensitive dynamic routing, makes the combination of parallel paths behave as a single large trunk group. Specifically, in accordance with the principles of my invention the forecasted OS-TS load A is augmented with a background load (BGL) that is related to the available capacity of all paths connecting the OS-TS pair. The combined load A + BGL is converted to an equivalent load R + BGL' in accordance with the earlier described method and a reduced equivalent load R corresponding to forecasted load A is obtained from this process.

The actual background load can be evaluated for each OS-TS pair, as follows:

$$\text{Background Load} = \sum_{a_k} \min \left[ \max_{h}(A_m^h(1)), \max_{h}(A_n^h(2)) \right]$$

where $a_k$ is the set of all candidate 2-link paths $L_k$ of OS-TS pair k, $A_m^h(1)$ is the forecasted offered load to OS-TS pair m associated with link 1 of the 2-link path $L_k$ in hour h.

$A_n^h(2)$ is the forecasted offered load to OS-TS pair n associated with link 2 of the 2-link path $L_k$ in hour h.

Figure 6:
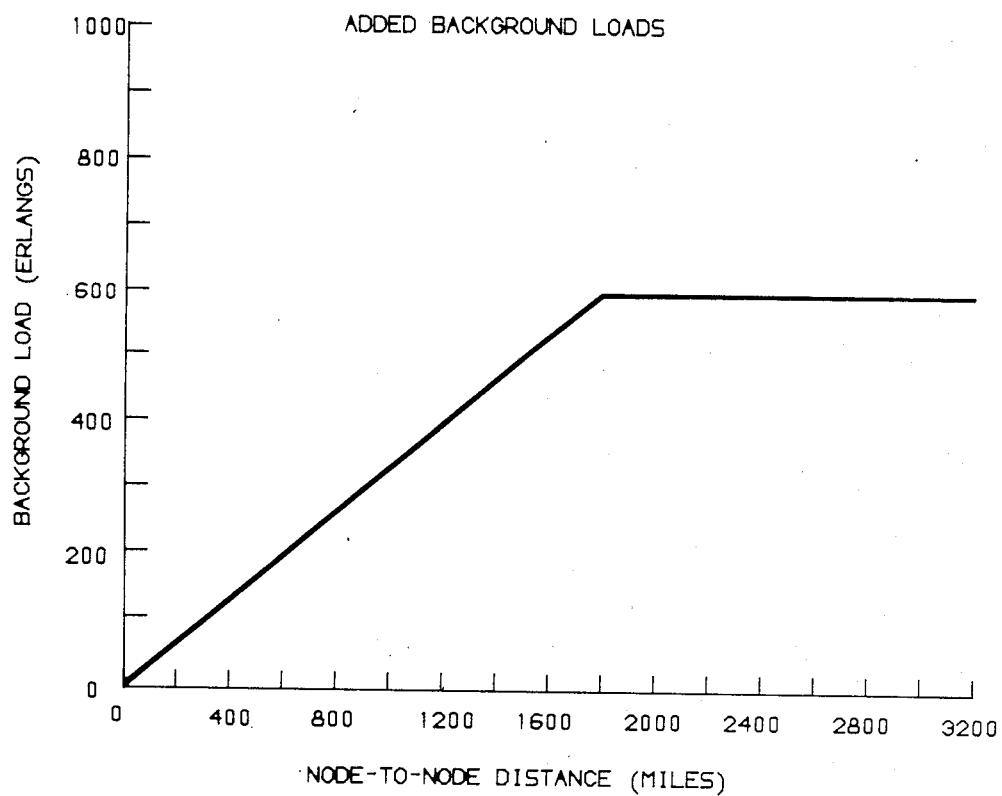
FIG. 6 depicts the background load approximation used to determine the equivalent day-to-day load.

Alternatively, it turns out that the network design realizes substantial improvement even from an approximation of the background load, and the approximation which I employ requires essentially no processing time. The employed background load approximation, shown in FIG. 6, increases linearly with distance between the nodes up to approximately 1800 miles, where it reaches 600 erlangs. It remains at 600 erlangs for all distances above 1800 miles. This relationship of background load vs. distance is derived from a statistical fit to empirical data obtained from the AT&T toll network. Clearly, such a relationship could be developed for any network.

Thus, the modified UA develops improved determinations of appropriate link sizes (trunks) and routing sequences in modules 431, 432 and 451. The trunks are installed in the network and the routing information is communicated to dynamic router 471 wherein updates to the routing sequences are developed based on traffic data and idle trunk status information arriving from network 411.

Route Update Process

The route update process implemented in dynamic router 471 determines the least loaded paths for each OS-TS pair in network 411. When conditions in network 411 require, the necessary least loaded paths are sent to the appropriate switching offices in network 411 wherein previous "subsequent choice" paths are pushed down in their ordinal order (previous second choice path becomes third choice path, etc.). The least loaded path then becomes the second choice path (and the first alternate path) for the affected OS-TS pair.

Figure 7:
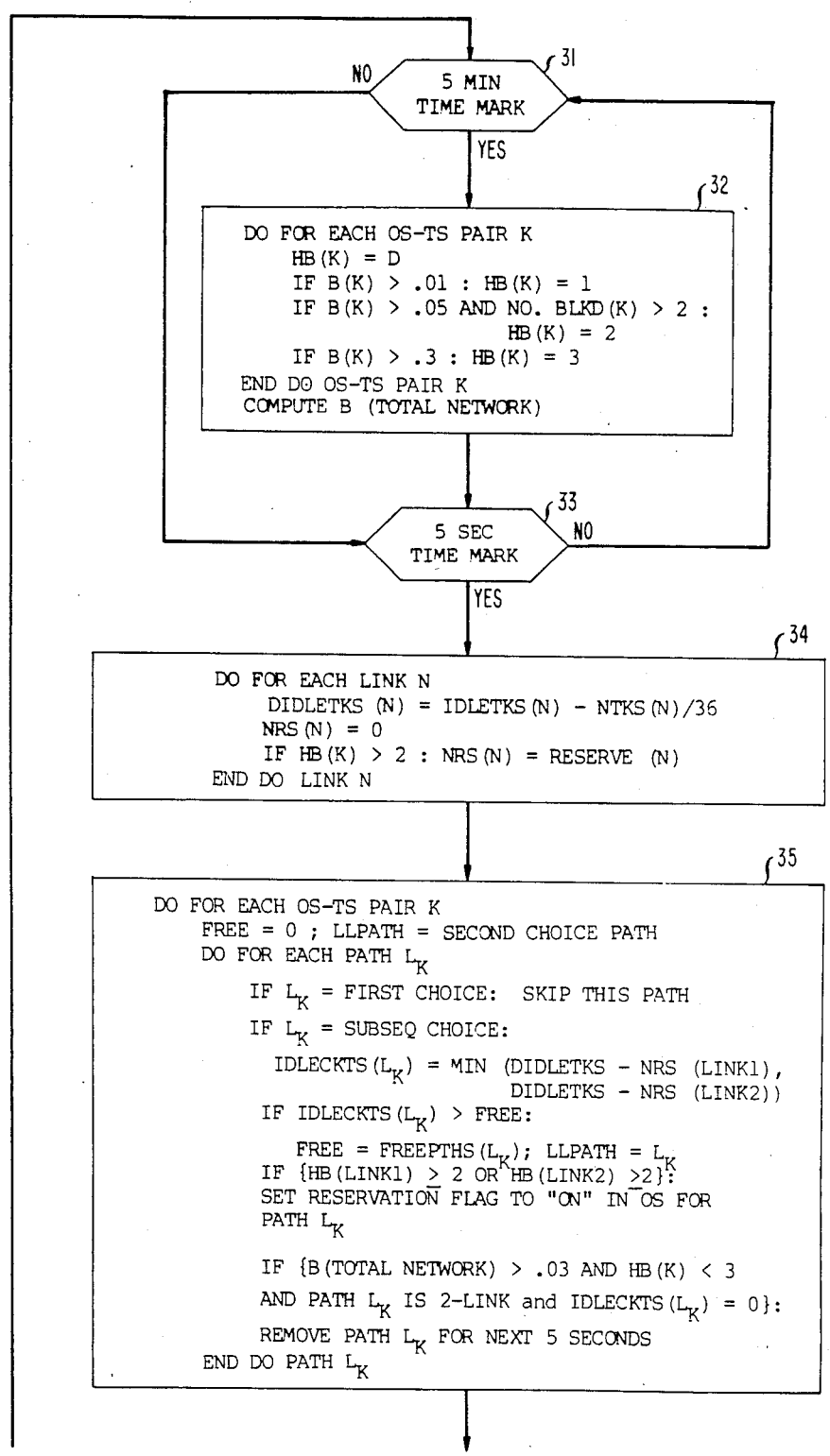
FIGS. 7 and 8 set forth a flow chart illustrating the route updating process.
Figure 8:
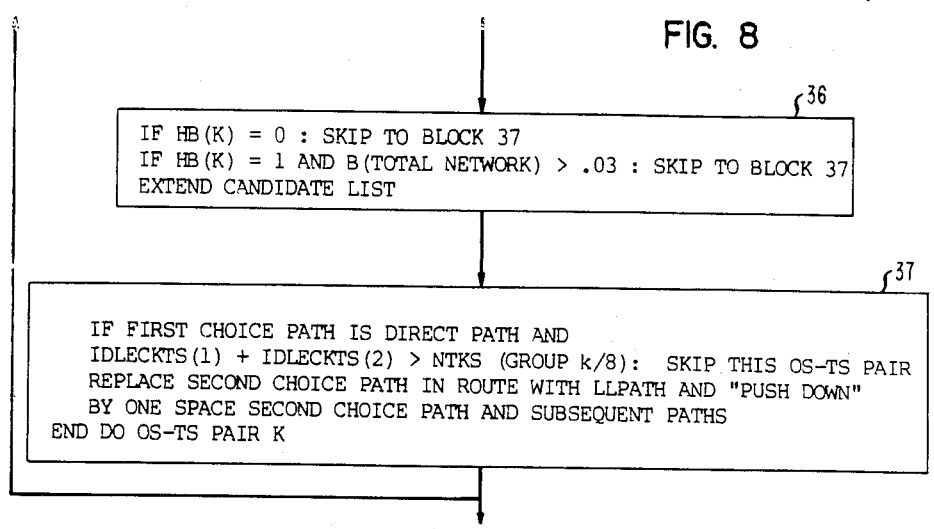

The process within router 471 operates with two cycle times. The traffic within network 411 is evaluated at a five-minute cycle time, and the idle trunk's status is evaluated at a five-second cycle time. The traffic information is used to determine OS-TS pairs that experience high levels of blocking, while the idle trunk's information together with the developed blocking information is used to determine whether route sequence changes are in order. FIGS. 7 and 8 depict a flow chart of the route update process of dynamic router 471.

Viewed globally, the flow chart of FIGS. 7 and 8 describes an iterative process that comprises a number of steps. These steps are (1) detection of high blocking (HB) OS-TS pairs, (2) computation of idle trunks and reservation level for each trunk group, (3) computation of path capacity and least loaded path for each OS-TS pair, (4) extension of routing searches for idle capacity to additional candidate paths, and (5) computation of new routing sequences.

The first step in the flow chart of FIGS. 7 and 8, the step of detecting HB pairs (block 32), operates at the five-minute cycle time, as indicated above. The remaining steps operate at the five-second cycle time. The different repetition rate of the different steps is depicted in FIGS. 7 and 8 by decision blocks 31 and 33.

The process of block 32 is applied to every OS-TS pair, K, as signified by the "do" loop in block 32. Within the do loop, a "high blocking" indicator (HB(K)) is calculated for each OS-TS pair K based on the blocking level experienced by the OS-TS pair K based on the blocking level experienced by the OS-TS pair. The blocking level on an OS-TS pair is the ratio of blocked calls to attempted calls (over the past five-minute interval). Initially, HB(K) is set to zero. When the blocking level is greater than 0.01 but less than 0.05, HB(K) is set to 1. When the blocking level is greater than 0.05 but less than 0.3, HB(K) is set to 2 if the actual number of blocked calls exceeds 2 (otherwise, HB(K) is set to zero). The latter caveat is added to insure a statistical significance to the finding that the blocking level is higher than 0.05. When the blocking level exceeds 0.3, HB(K) is set to 3 if the number of blocked calls exceeds 2. In addition to setting the HB(K) of each OS-TS pair, the process of block 32 computes an overall network blocking level by computing the total number of blocked calls divided by the total number of attempted calls. This overall network blocking level is used in a later step.

Step 2 in the flow chart of FIGS. 7 and 8 (block 34) evaluates the discounted number of idle trunks in network 411 and sets a reservation level for each trunk group (link), N. It may be noted, in passing, that whereas the process in step 1 deals with traffic between OS-TS pairs regardless of the links used, step 2 deals with specific links in network 411. The number of discounted idle trunks in each link is computed by discounting the number of actual die trunks by the number of trunks in the group divided by 36. Discounting of the number of idle trunks by a fraction of the total number of trunks in the group (link), such as dividing the total number of trunks in the group by 36, prevents overselection of a large group as a least loaded path.

In addition to determining the number of discounted idle trunks in a link, the process of block 34 sets a trunk reservation level for the link. The concept of trunk reservation on a link deals with the traffic intensity between the offices directly connected to the link. When the traffic between those offices is high, a selected number of trunks on the direct link are reserved for traffic originating and terminating in those offices. Specifically in connection with the system of FIG. 2, the process of block 34 reserves trunks in each link where the HB(K) level exceeds 1. The number of reserved trunks is related to the size of the trunk group as follows:

| Actual Size of Trunk Group | Reserved Number of Trunks |
|---|---|
| 1-12 | 0 |
| 13-36 | 1 |
| 37-72 | 2 |
| 73-132 | 3 |
| 133-216 | 4 |
| 217-396 | 5 |
| 397-720 | 6 |
| ≧721 | 7 |

Step 3 in the flow chart of FIGS. 7 and 8 (block 35) computes the path capacity and least loaded path for each OS-TS pair. The computation is performed with two do loops: an "outside" loop that accounts for each OS-TS pair in network 411, and an "inside" loop that investigates all path candidates for each OS-TS pair.

Each path candidate is first checked to determine whether it is the "first choice" path for the associated OS-TS pair. If so, then the path is skipped. If the path is determined to be a "subsequent choice" path, then the number of free trunks in each link in the path is discounted by the reservation level of the link. The number of idle circuits in the path is, again, computed to equal the lowest number of discounted idle trunks on any of the links making up the path. In connection with all "subsequent choice" paths, as the number of idle circuits is computed, a record is kept of the path with the largest computed number of idle circuits. Consequently, at the end of the inside do loop the least loaded path is identified for the OS-TS pair under consideration. Also, if HB(Link 1) or HB(Link 2) is greater than 1 for any path, the reservation flag is set to "on" in the OS for that path; this action will cause trunk reservation to be applied to this path in the network. Finally, when total network blocking is greater than 0.03, two-link paths with zero discounted idle circuits are removed from the routing sequence (unless HB(K) equals 3).

Step 4 in the flow chart of FIGS. 7 and 8 (block 36) continues the outside do loop of step 3 and considers whether path candidates not considered in step 3 should be evaluated. The test whether or not to consider additional candidates relates to the traffic congestion in network 411. In FIGS. 7 and 8, a second candidate list is considered for each OS-TS pair with a blocking level HB(K) greater than zero; unless the overall network blocking level is greater than 0.03, in which case the second candidate list is considered only if the OS-TS pair blocking level HB(K) is greater than 1.

Step 5 in the flow chart of FIGS. 7 and 8 (block 37) applies a threshold to each OS-TS pair to determine whether a route update is needed. The threshold is applied only for the typical case in which the direct path is the "first choice" path and a two-link path is the second choice. If the total number of idle trunks on these two choices is greater than a threshold number that is sufficient to permit completion of all calls likely to arrive over the next five-second update interval, then a new routing sequence is not generated. The threshold selected for the system of FIG. 2 is ⅛th of the number of trunks in the direct link. If there is insufficient capacity in the first and second choice paths for the expected call volume and if the computed least loaded path is other than the existing second choice path, then the new least loaded path is sent to the originating switch to replace the second choice path and all previous "subsequent choice" paths are "pushed down" one level.

Integrated Transmission System (ITS) Controller

Integrated transmission system controller 491 functions include the allocation of bandwidth to CSVB, PSNB, and CSWB traffic on the integrated transmission systems and the computation of the maximum number of narrowband trunks (NTs) for the PSNB transmission bandwidth and the maximum number of voiceband trunks (VTs) for the CSVB transmission bandwidth. The maximum number of NTs or VTs is given by $N_i = \rho_i BW_i / r_i$, where $N_i$ = maximum number of NTs or VTs on link i,
$BW_i$ = bandwidth available for PSNB services or CSVB services on link i,
$\rho_i$ = maximum allowed utilization of $BW_i$,
$r_i$ = average data rate per NT or VT on link i.

The maximum allowed utilization $\rho_i$ is selected on the basis of the packet delay constraint or voice quality constraint on link i imposed on PSNB services and CSVB services. The average NT or VT data rate $r_i$ is periodically measured by the INC. A sufficiently large change in the measured $r_i$ causes the INC to change the $N_i$ parameters in the switch. ITS controller 491 dynamically allocates ITS bandwidth to traffic components in an effort to minimize blocking for CSVB or CSWB services and to delay for PSNB services. A sufficiently large change in the bandwidth allocation also causes the INC to change the $N_i$ parameters in the switch.

Routing Services Controller

Routing services controller 492 shown in FIG. 3 allows the INC 100 to control call routing to permit customer selection of routing on designated facility types. This category of services is known as selective routing service (SRS). For example, a customer might select routing that avoids bit compression multiplexers. Such multiplexers provide 32 kbps voiceband encoding for efficient transmission of voice but are not transparent to high-speed voiceband data. Other specific transmission characteristics that could be requested are satellite avoidance, routing can on secure facilities (e.g., lightguide or coax), or routing on high quality voice transmission facilities. A customer could initiate an SRS call by dialing special digit codes.

In operation, the originating switch in network 411 recognizes that the call requires selective routing and sends a CCIS message to its associated INC 100 specifying the required service. The INC 100 determines the proper call routing using a facility data base and also its status data base. Path candidates for the call are generated by the INC 100 and returned to the switch.

Figure 9:
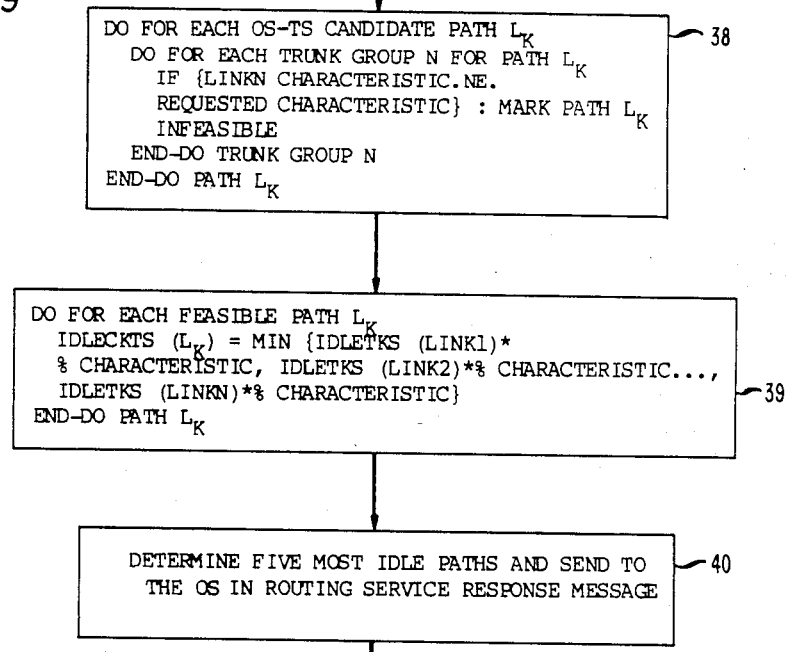
FIG. 9 sets forth a flow chart illustrating the process of customer selection of routing path characteristics (selective routing service)
Figure 10:
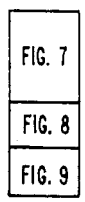
FIG. 10 shows the alignment of FIGS. 7-9.

A flow chart of the SRS processing logic is given in FIG. 9. When a routing service request message is received by INC 100, the controller first determines whether each trunk group for each OS-TS path candidate meets the requested characteristic (block 38 in FIG. 9). For the list of feasible paths which meet the required characteristic, INC 100 then estimates the number of idle trunks on each trunk group with the required characteristic for each feasible path choice (block 39 in FIG. 9). The estimate equals the number of idle trunks in the trunk group multiplied by the fraction of trunks that have the required characteristic. The INC 100 then determines the number of idle circuits on each feasible path choice and selects up to five most idle feasible paths and places these in the routing service response message to the originating switch (block 40 in FIG. 9). The originating switch uses the routing sequence identified in the message together with the routing service type to select the trunk connection that meets the required characteristics.

What is claimed is:

1. A nonhierarchical switching network system comprising switches, links interconnecting said switches, means within each of said switches to originate a connection to any other one of said switches based on path information stored within each of said switches that originate a connection (originating switches) (OS), a controller, and means for each of said switches to send traffic and link capacity information to said controller characterized by:

means for computing for each of said originating switches a first path choice and an ordered group of subsequent path choices comprising second and subsequent choice paths, corresponding to each connection of the originating switch to other ones of said switches;

means for communicating to each of said originating switches path choices computed therefor by said means for computing;

means for developing updated path choices for connection of each of said switches to each other of said switches based on a least loaded path approach in accordance with said traffic and link capacity information; and means for installing said updated path choices at the head of corresponding ones of said ordered groups of subsequent path choices, thereby making said updated path choices the second choice paths and pushing down in order said second and subsequent choice paths in said groups of subsequent path choices.

2. In a switching network system having a plurality of switches and multi-trunk links interconnecting said switches, where any one of said switches serving as an originating switch (OS) may connect to any other of said switches serving as a terminating switch (TS), where path selection is made by said OS in accordance with information provided by a common controller and stored in said OS, and where traffic information and idle trunk information is sent by said network to said common controller, the improvement in said controller comprising:

first operational means responsive to said traffic information representing a traffic load for computing a first path choice and subsequent path choices consisting of second and succeeding path choices for each potential pairing of an originating switch and a terminating switch (OS-TS pair) in said network, developing thereby a routing sequence for each of said OS-TS pairs;

second operational means responsive to said traffice and idle trunk information for computing at least loaded path for each of said OS-TS pairs;

third operational means responsive to said traffic information for enabling replacement of said second path choice in said routing sequence for each of said OS-TS pairs with said least loaded path computed by said second operational means corresponding to each of said OS-TS pairs; and fourth operational means for communicating to each OS in said network said routing sequences and said least loaded path replacement for said second path choices for said OS.

3. The system of claim 2 wherein said first operational means additionally develops a measure of the required number of trunks in each link in said network.

4. The system of claim 3 wherein said first operational means compensates for day-to-day traffic variations when developing said measure of required number of trunks and said routing sequences.

5. The system of claim 4 wherein said first operational means compensates for said day-to-day variations by evaluating and adding a background traffic carrying capacity to each OS-TS pair for purpose of computing an equivalent traffic load.

6. The system of claim 4 wherein said first operational means compensates for said day-to-day variations by estimating and adding a background traffic carrying capacity to each OS-TS pair for purpose of computing an equivalent traffic load.

7. The system of claim 6 wherein said background traffic carrying capacity of each OS-TS pair is as a function of the distance between the originating switch and the terminating switch of said OS-TS pair.

8. The system of claim 2 wherein said third operational means is characterized by:
fifth operational means responsive to said traffic and idle trunk information for evaluating likelihood of blocking on each of said OS-TS pairs;
sixth operational means for replacing said second path choice of each OS-TS pair with said least loaded path computed by said second operational means corresponding to said each OS-TS pair when said likelihood of blocking for said OS-TS path exceeds a preselected threshold and said second path is different from said corresponding one of said least loaded paths.

9. The system of claim 2 wherein said second means includes a list of path candidates to each OS-TS pair and computes said least loaded path by ascertaining the capacity of each path candidate and selecting as the least loaded path the candidate with the largest capacity that is not the first path for said OS-TS pair.

10. The system of claim 2 wherein said second operational means maintains a trunk status map that, responsive to said idle trunk information, reflects the number of idle trunks and location of idle capacity in said network.

11. The system of claim 2 wherein said second operational means is responsive to traffic information accumulated over a preselected time interval.

12. The system of claim 1 further including within said controller means for determining high blocking levels on node pairs within said switching network and directing said network to reserve a portion of the direct links of said node pairs of use only as first choice paths.

13. The system of claim 1 further including within said controller
means for determining high blocking levels on switch pairs within said switching network and directing said network to reserve a portion of the direct links between said switch pairs for use only as first choice paths; and
means for increasing the number of said subsequent path choices considered by said means for computing which are searched for high blocking switch pairs.

14. The system of claim 1 further including within said controller
means for determining high blocking levels on node pairs within said switching network and directing said network to reserve a portion of the direct links of said node pairs for use only as first choice paths;
means for increasing the number of said subsequent path choices considered by said means for computing which are searched for high blocking switch pairs; and
means for removing from consideration busy paths under high network blocking conditions.

15. The system of claim 1 further including within said controller means for determining allocation of bandwidth to different types of traffic on said links.

16. The system of claim 1 further including within said controller means for permitting customer specification selection of said path choices.

* * * * *